united States Patent Office 3,458,413
Patented July 29, 1969

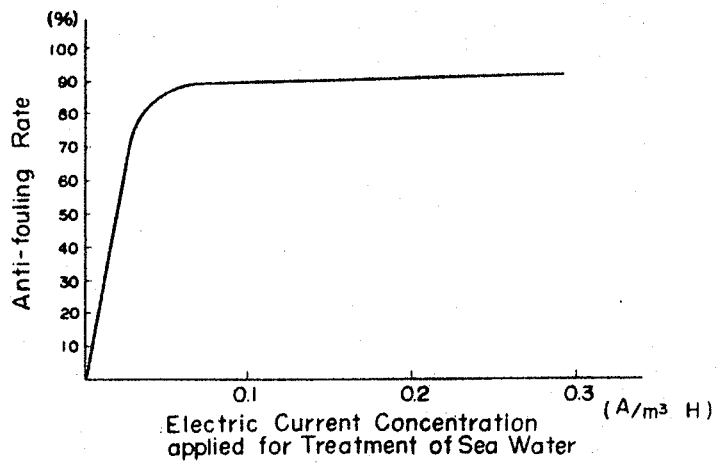
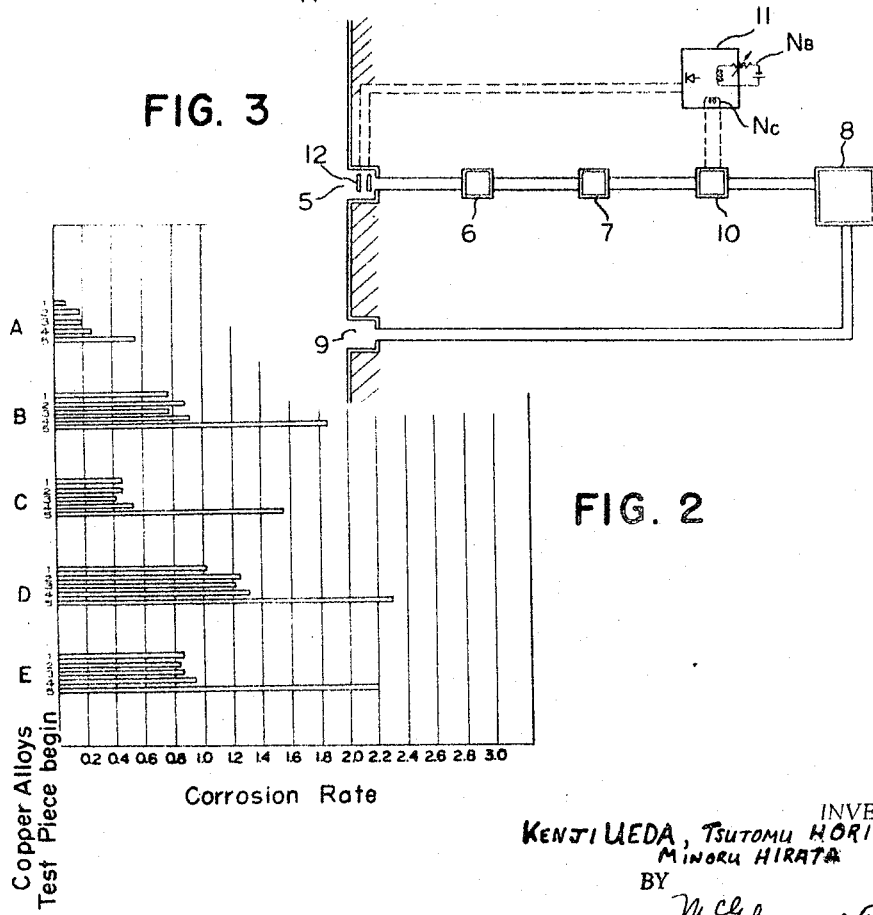

3,458,413
METHOD OF INHIBITING FOULING OF SEA WATER CONDUITS AND THE LIKE BY MARINE ORGANISMS
Kenji Ueda, Tsutomu Horiguchi, and Minoru Hirata, Nagasaki-shi, Japan, assignors to Messrs. Mitsubishi Jukogyo Kabushiki Kaisha, Tokyo, Japan
Filed Mar. 7, 1966, Ser. No. 532,155
Claims priority, application Japan, Mar. 10, 1965, 40/13,886
Int. Cl. C23f *13/00, 15/00*
U.S. Cl. 204—147         6 Claims

ABSTRACT OF THE DISCLOSURE

A method of inhibiting fouling and blocking, by marine organisms, of sea water passages, includes disposing a pair of electrodes in the sea water passage, the electrodes including an anode of material which is insoluble in sea water as an electrolyte. A current is passed between the electrodes and has a concentration, in the sea water in the passage, of from 0.06 to 1 ampere per cubic meter per hour of the flow rate of sea water through the passage.

---

This invention relates to the inhibition of fouling of sea water conduits and the like by marine organisms and, more particularly, to a novel method of and apparatus for inhibiting such fouling in equipment using sea water such as conduits, condensers, cooling apparatus, sanitary apparatus and other apparatus.

Equipments exposed to sea water, such as condensers or other cooling apparatus installed in ships or on land, are subject to incrustation with or fouling by marine organisms such as sea mussels, barnacles, serpulae, or sea weeds. This fouling is usually observed within a few months after installation of the equipment, when the water passages of the equipment are blocked owing to the incrustation of these fouling organisms found in sea water. In addition, another result is corrosion of the material of pipes of the cooling apparatus and other damage. It generally requires a good deal of time and expense to clear or scrape off the undesired fouling organisms and to restore the equipment to its original condition.

Among the methods used in practice for checking fouling of the submerged portions of a ship by marine organisms has been the more or less conventional expedient of applying an anti-fouling coating to these portions. However, the anti-fouling coating has not necessarily been a satisfactory answer to the problem.

In the case of sea water conduits used for cooling condensers in a steam power plant, a chlorine injection method has been used in practice. In this method, chlorine is injected into the sea water from a chlorine container. However, this method requires a fairly large expenditure for installation and maintenance.

An object of the present invention is to provide an improved method for inhibiting fouling of sea water conduits and the like by marine organisms.

Another object of the invention is to provide an improved apparatus for inhibiting fouling of sea water conduits and the like by marine organisms.

A further object of the invention is to provide a novel method of and apparatus for inhibiting fouling of sea water conduits and the like by marine organisms, and which involves the use of a material insoluble in an aqueous solution as an anode for electrolysis of the sea water containing chlorine and chlorine compounds, such as sodium chloride or magnesium chloride.

Still another object of the invention is to provide a method of and apparatus for inhibiting fouling of sea water conduits and the like by marine organisms and which is extremely effective in checking adhesion of these organisms to pipes and other surfaces exposed to sea water.

Still a further object of the invention is to provide a method of and apparatus for inhibiting blocking of sea water conduits and passages and which is less expensive, simpler and safer than the conventional chlorine injection method.

Yet another object of the invention is to provide a method of and apparatus for inhibiting fouling of sea water exposed surfaces by marine organisms, and involving electrolysis treatment of the sea water under specifically selected conditions whereby adhesion of the organisms is effectively checked and corrosion of the pipes is effectively prevented.

More specifically, the present invention is directed to a method of and apparatus for inhibiting blocking of sea water flow passages and which is characterized by the electrolysis treatment of sea water introduced into the passages. The electrolysis treatment is effected by using an anode which is insoluble in the aqueous solution to be treated and by arranging the electric current concentration in the sea water to be within the range of from 0.06 a./(m.³/h.) to 1 a./(m.³/h.).

It should be noted, at this point, that the term "electric current concentration" just mentioned means, in accordance with this invention, the rate of flow of electricity for unit time and through a unit volume of a flowing liquid. Thus, the rate of flow of the electric current per unit time and through a unit volume is measured with respect to the current concentration in the liquid or sea water. For example, 0.06 a./(m.³/h.) means that an electric current of 0.06 is used for a flow of one cubic meter of sea water per hour.

In accordance with the invention, inhibition of the blocking or fouling of sea water passages is effected by an electrolysis treatment of the sea water using an insoluble material, such as platinum, magnetic iron oxide, platinum-plated titanium, platinum-plated silver, carbon, platinum palladium alloys, or lead alloys (e.g. silver lead) as an anode. The sea water flowing through the sea water passages contains nascent chlorine and chlorine derivatives, and these are released by the electrolysis treatment and thus inhibit the development of undesirable marine plants and animals on the surfaces of the pipes or passages without giving rise to corrosion of the metal used to form the sea water passages.

For an understanding of the principles of the invention, reference is made to the following description of a typical and preferred embodiment thereof which is shown in the accompanying drawings.

In the drawings:

FIG. 1 is a diagram graphically illustrating the relation between the electric current concentration in the sea water and the anti-fouling rate;

FIG. 2 is a diagram graphically illustrating corrosion rates of various copper alloys; and FIG. 3 schematically illustrates one embodiment of apparatus for practicing the method of the invention.

In a preferred embodiment of the invention, an electrolytic cell was provided at a sea water intake and electrolysis of the sea water was effected in the cell using an anode of insoluble material, particularly platinum-plated titanium, and mild steel as a cathode. Sea water containing the resulting nascent chlorine and chlorine derivatives was introduced into a sea water conduit or passage. Under these conditions, an experiment was conducted to observe the deposition conditions of the marine organisms fouling the pipes under the conditions set forth in Table I below.

It was observed that there exists a relation, as illustrated in FIG. 1, between the quantity or amount of electrolytic current per cubic meter of sea water per hour, or the current concentration a./(m³./h.), in a closed piping system like the sea water intake pipes of ships and the like, and the anti-fouling rate for inhibiting deposition of marine organisms. The anti-fouling rate may be expressed as the following percentage:

$$\left[\frac{\begin{array}{c}\text{Weight of deposits}\\\text{when no electrolysis}\\\text{treatment is made}\end{array} - \begin{array}{c}\text{Weight of deposits}\\\text{when electrolysis}\\\text{treatment is made}\end{array}}{\begin{array}{c}\text{Weight of deposits when no}\\\text{electrolysis treatment is made}\end{array}} \times 100\right]$$

TABLE I

Type of anode: Insoluble anode
Current density at anode _____ a./dm.² __ 1–10
Current concentration _____ a./m.³/h __ 0–1
Flow rate of sea water _____ m./sec. __ 0.5–2

Note: Current efficiency in insoluble anode is about 50% (as residual chlorine). There remains a possibility that Mg and Ca ions may be separated in the form of $Mg(OH)_2$ $CaCO_3$ on the anode surface and may act to narrow the anode- cathode interval, thus causing resistance against the liquid flow. However, there is observed no such separation when the cathode current density is above 1 a./dm.²

As may be observed from FIG. 1, when the current concentration is above 0.06 a./(m.³/h.), the resulting anti-fouling rate remains above 90%. However, it should be understood that sea water treatment at too high current concentration will promote corrosion of metals, such as iron, steel, copper, copper alloys, etc., in the sea water intake pipe system by the action of the electrolytically produced nascent chlorine and chlorine derivatives. Accordingly, an expedient was conducted to compare the degrees of corrosion observed in various metal materials immersed in non-electrolyzed sea water and the same materials immersed in electrolyzed sea water. The experiment was conducted for a duration of 1200 hours at a water flow rate of 0.2 m./sec. in each instance. FIG. 2 grahically illustrates the corrosion rates of various copper alloys, while Table II (below) shows the corrosion rates of steels:

TABLE II

| Type of steel material used | Sign affixed to each test piece | Current concentration (a./(m.³/h.)) | Corrosion rate ((mg./m.²)/month) |
|---|---|---|---|
| Mild steel | 1 | 0 | 12.2 |
|  | 2 | 0.06 | 12.2 |
|  | 3 | 0.3 | 13.6 |
|  | 4 | 1.0 | 14 |
| Galvanized steel | 1 | 0 | 0.68 |
|  | 2 | 0.06 | 0.61 |
|  | 3 | 0.3 | 0.69 |
|  | 4 | 1.0 | 0.7 |

Each test piece sign in FIG. 2 represents the corresponding current concentration as shown in Table III below.

TABLE III

Test piece sign:    Current concentration (a./m.³/h.)
 1 _____ 0
 2 _____ 0.06
 3 _____ 0.03
 4 _____ 1.0
 5 _____ 3.0

The copper alloys used for the tests may include Monel metal (A), 7–3 cupro-nickel (B), 8–2 cupro-nickel (C), 9–1 cupro-nickel (D) and aluminum brass (E). Each test piece prepared from a copper alloy was formed into longitudinally slivered pipe of 20 mm. diameter and 100 mm. length. With respect to the test pieces of mild steel and galvanized steel, these were formed to dimensions of 80 x 50 x 3 millimeters.

From FIG. 2, it will be noted that each of the copper alloys remains quite free from an increase in corrosion rate when the current concentration is held at or below 1 a./(m.³/h.), but that the corrosion is sharply accelerated when the current concentration is increased from 1 a./(m.³/h.) to 3 a./(m.³/h.). On the other hand, the mild steel and galvanized steel remained unchanged with respect to corrosion rates, up to 1 a./(m.³/h.). Therefore it will be apparent that, when using an insoluble anode, the effective current concentration is limited, for its lower value, by the anti-fouling rate and, for its upper limit, by corrosion of the metal structure for the sea water conduits.

Apparatus for performing the method of the invention will be described with particular reference to FIG. 3. The embodiment of the invention illustrated in FIG. 3 represents the sea water conduit or pipe circulating system in a marine vessel. Sea water 4 is pumped in through sea water intake 5, generally known as the "sea chest." Pumping is effected by means of the pump 7 which draws the sea water through a leaching cell 6 where the sea water is cleared of filth and contaminants and is purified. The sea water is discharged from pump 7 to equipment utilizing sea water and exposed to the latter. For example, the sea water may be fed to a boiler condenser 8 and then discharged into the sea through a discharge port 9.

In the arrangement shown in FIG. 3, the sea water is treated electrolytically to prevent blocking of the pipes due to incrustation with marine fouling organisms. To facilitate this treatment, a flow rate communicator 10 for indicating the change of flow rate of the sea water is provided at a proper place in the circulating system. The signals from flow rate communicator 10 are transmitted to a saturable reactor magnetic amplifier-type electrolytic current regulator 11, and control the electrolytic current supplied to the electrolysis electrodes 12 positioned at a suitable place, for example, in the sea chest 5. The flow rate communicator 10 used in the system of FIG. 3 may be an electronic pressure difference transducer.

It should be noted that direct current at an intensity between 1 ma. and 5 ma., and variable in accordance with changes in the flow rate, appears at the output of flow rate communicator 10 and is impressed across the control coil Nc of regulator 11. Thereby, electric current at a current value proportional to the flow rate is controlled to flow between the electrodes 12. In FIG. 3, $N_B$ in regulator 11 represents the bias coil which regulates the relation between the input current and the output current.

By virtue of electrolytically treating the sea water while maintaining the current concentration (a./(m.³/h.)) in the range of from 0.06 to 1, in accordance with the rate of flow of the sea water, it is possible to effectively inhibit blockage of the sea water flow passages in engine cooling systems, sanitary systems of ships, condenser cooling tubes, and other systems in both sea and land machinery while at the same time preventing corrosion of the equipment exposed to the sea water. For clean or pure sea water the current concentration of 0.06 a./(m.³/h.) will suffice, while for sea water containing originally organisms $H_2S$ etc., the current concentration must be increased. As with the current concentration of 1 a./(m.³./h.), however, any living things can breed no more, the current concentration need not exceed this value.

What is claimed is:

1. A method of inhibiting fouling and blocking, by marine organisms, of sea water passages, said method comprising the steps of disposing a pair of electrodes, including an anode insoluble in sea water electrolyte, in spaced relation in the sea water passage; and passing between said electrodes an electric current having a concentration, in the sea water in the passage, of from 0.06 to 1 ampere per cubic meter per hour of flow rate of sea water flowing through the sea water passage.

2. A method of inhibiting, fouling and blocking, by marine organisms, of sea water passages, as claimed in claim 1, in which said electrodes are disposed in the entering sea water.

3. A method of inhibiting fouling and blocking of sea water passages, as claimed in claim 1, including the step of varying the current concentration in accordance with the rate of flow of the sea water.

4. A method of inhibiting fouling and blocking of sea water passages, as claimed in claim 3, in which the material of the other electrode is selected from the group consisting of mild steel and galvanized steel.

5. A method of inhibiting fouling and blocking of sea water passages, as claimed in claim 1, in which the current concentration is set in accordance with the purity of the sea water.

6. A method of inhibiting fouling and blocking of sea water, as claimed in claim 1, in which the material of said anode is selected from the group consisting of platinum, magnetic iron oxide, platinum-plated titanium, carbon, platinum-plated silver, platinum-palladium alloys and lead alloys.

References Cited

UNITED STATES PATENTS

| | | | |
|---|---|---|---|
| 751,986 | 2/1904 | Kartmark | 204—149 |
| 1,277,378 | 9/1918 | Case | 204—229 |
| 2,046,467 | 7/1936 | Krause | 204—229 |
| 3,010,886 | 11/1961 | Chappell | 204—196 |
| 3,303,118 | 2/1967 | Anderson | 204—196 |

FOREIGN PATENTS

| | | |
|---|---|---|
| 823,531 | 11/1959 | Great Britain. |
| 431,375 | 2/1948 | Italy. |

JOHN H. MACK, Primary Examiner

T. TUNG, Assistant Examiner

U.S. Cl. X.R.

204—149, 196, 229